April 26, 1960 E. O. BLODGETT 2,934,145

JUSTIFICATION CONTROL INFORMATION RECORDER

Filed Oct. 31, 1955 6 Sheets-Sheet 1

INVENTOR.
EDWIN O. BLODGETT
BY [signature]
ATTORNEY

JUSTIFICATION CONTROL INFORMATION RECORDER

Filed Oct. 31, 1955 6 Sheets-Sheet 2

INVENTOR.
EDWIN O. BLODGETT
BY
ATTORNEY

April 26, 1960 E. O. BLODGETT 2,934,145

JUSTIFICATION CONTROL INFORMATION RECORDER

Filed Oct. 31, 1955 6 Sheets-Sheet 3

INVENTOR.
EDWIN O. BLODGETT
BY P. E. Henninger
ATTORNEY

INVENTOR.
EDWIN O. BLODGETT
BY
ATTORNEY

JUSTIFICATION CONTROL INFORMATION RECORDER

INVENTOR.
EDWIN O. BLODGETT

BY

ATTORNEY

INVENTOR.
EDWIN O. BLODGETT
BY [signature]
ATTORNEY 2,934,145

JUSTIFICATION CONTROL INFORMATION RECORDER

Edwin O. Blodgett, Rochester, N.Y., assignor to Commercial Controls Corporation, Rochester, N.Y., a corporation of Delaware Application October 31, 1955, Serial No. 543,713

27 Claims. (Cl. 164—115)

The present invention relates to record-media controlled printing machines and, more particularly, to such machines for reproducing justified copy. While the invention is of general utility, it has particular utility in connection with justifying typewriters and will be described in that environment.

A trial-copy typewriter which operates to produce a control tape for the composition of justified lines is disclosed in United States Patent No. 2,700,421 granted January 25, 1955, to Edwin O. Blodgett. Manual manipulation of the typewriter key levers and functional controls in producing typed trial copy automatically produces a punched tape in which there is recorded character control codes and functional control codes required to reproduce each line of typed copy. Each line is followed by a recorded justification control code resulting from an automatic computation in the typewriter and establishing the relative values of word spacings in the line to effect line justification. Following the justification code is an end-of-line function code to return the typewriter carriage and begin a new line of copy.

The punched control tape produced as last described is then used in a justifying reproducer typewriter of the type disclosed in United States Patent No. 2,700,447, granted January 25, 1955, to Edwin O. Blodgett. This typewriter includes a justifying code reader through which the punched tape first passes to read the justification code at the end of each line. The justification code read from the tape is stored in relays of the typewriter, and the tape then passes through a print-code reader to read the print control and functional control information of the tape. This read information effects automatic operations of the typewriter to reproduce the copy recorded by the tape, but such reproduction is under control of a word spacing mechanism which responds to the stored justification code to alter the extent of spacing between successive words as required for justification of each line of copy. The normal extent of word spacing is two units, and may be varied for justification purposes by one, two, three, four or five units as required. The number of word spaces in which justification is accomplished is limited to eight, so that in any lines having more than eight word spaces the extent of spacing is always the normal two units after the eighth word space.

The justification code employed in the typewriters described is of 7 bit form, sometimes referred to as 7 channel form, and is accordingly not ordinarily suitable for wire transmission to a remote point since the major portion of present day wire communication systems employ 6 bit codes to a limited extent but more generally employ 5 bit codes.

It would accordingly be desirable to provide a justifying typewriter which produces punched tape or equivalent media recordings suitable for wire transmission to a remote point where the transmitted information can be readily used to reproduce copy in justified form. It would further be desirable that the media recording code used be not more than a 6 bit type, and even in this instance that the particular form of 6 bit code be one that can easily be converted to a 5 bit code for transmission and be easily reconverted to a 6 bit code for ultimate use.

As explained above, it has heretofore been conventional to record the necessary line-justification information as a 7 channel code at the end of each line, thus requiring that the record medium be read by a justification code reader preceding a print code reader in order that the justification information for any given line shall be known and be available for use in printing that line. It would be desirable, however, to provide punched tape or equivalent record media wherein the justification information for each line not only is of reduced channel width as earlier explained, but also is interposed in each line of print-control and functional-control information and directly establishes the word spacing values required to reproduce that line in justified form. This would substantially simplify the structure of the justifying typewriter by eliminating the justification code reader and the justification-control code interpreting complement of equipment and would permit the use of only one reader for all information necessary to reproduce justified copy. In producing such punched tape or record media, it would further be desirable that a clean-up operation occur whereby the usual prevalent condition of numbers of line deletions in an original trial-copy tape or record be automatically deleted in producing the new tape or record.

It is an object of the present invention, therefore, to provide a new and improved justifying typewriter or justifying-printer information recorder which processes one or more of the desirable characteristics last enumerated.

It is a further object of the invention to provide a novel justifying typewriter having increased flexibility of use and wider range of application than heretofore readily feasible.

It is an additional object of the invention to provide a justifying-printer information recorder which receives end-of-line justification information from a punched tape or equivalent record medium and automatically produces a new tape or record wherein the justification information is recorded in interspersed word-space relation within the line to which the information relates.

It is yet a further object of the invention to provide a justifying-printer information recorder which receives 7 channel justification information and produces a punched tape or equivalent record medium in which such information is automatically converted to and recorded in 6 channel form suitable for wire transmission.

Other objects and advantages of the invention will appear as the detailed description proceeds in the light of the drawings forming a part of this application and in which.

Figures 1, 7:
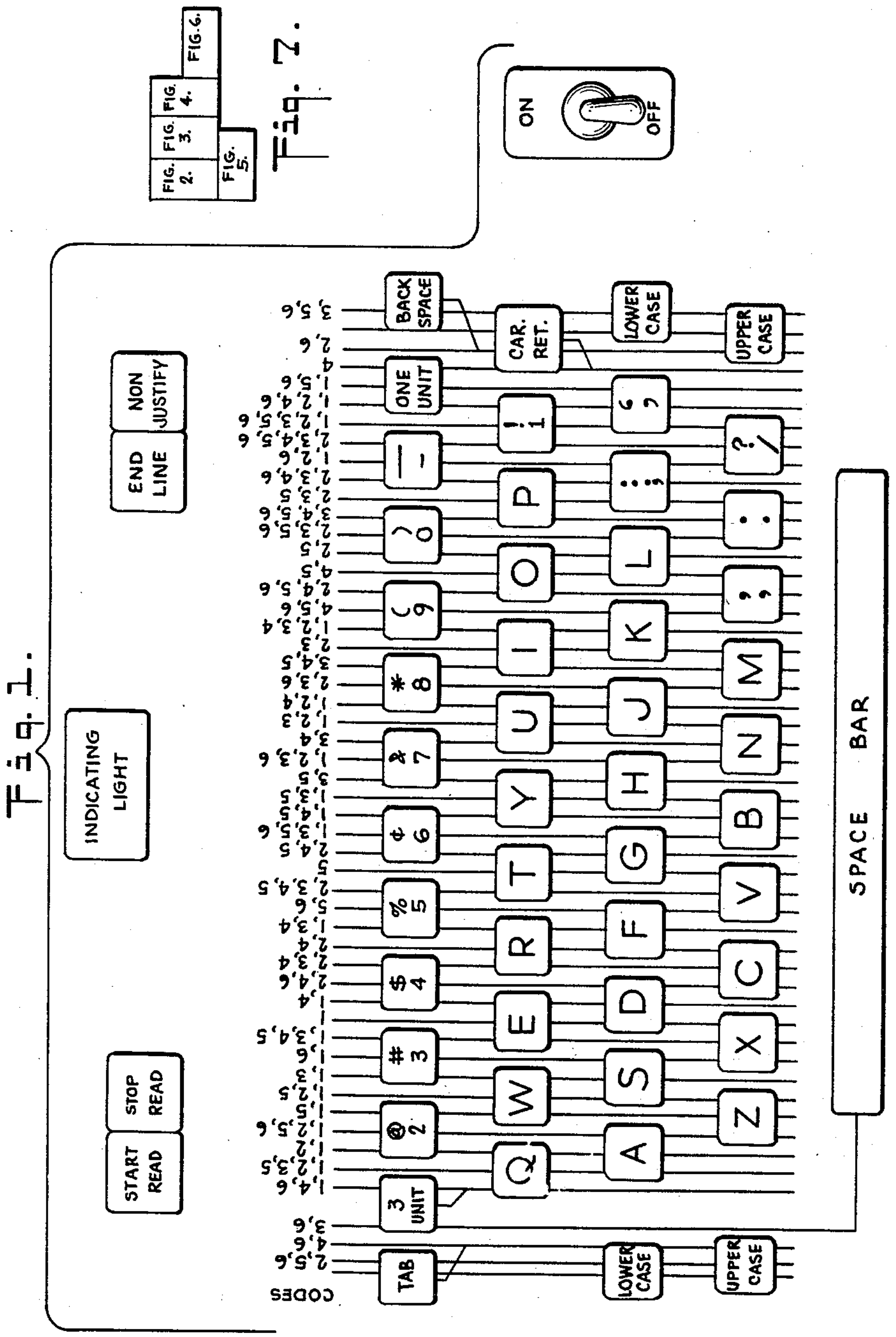
Fig. 1 illustrates a keyboard suitable for use with a justifying typewriter embodying the present invention.
Fig. 7 shows the manner in which these figures should be considered together as a unitary electrical control system.
Figure 2:
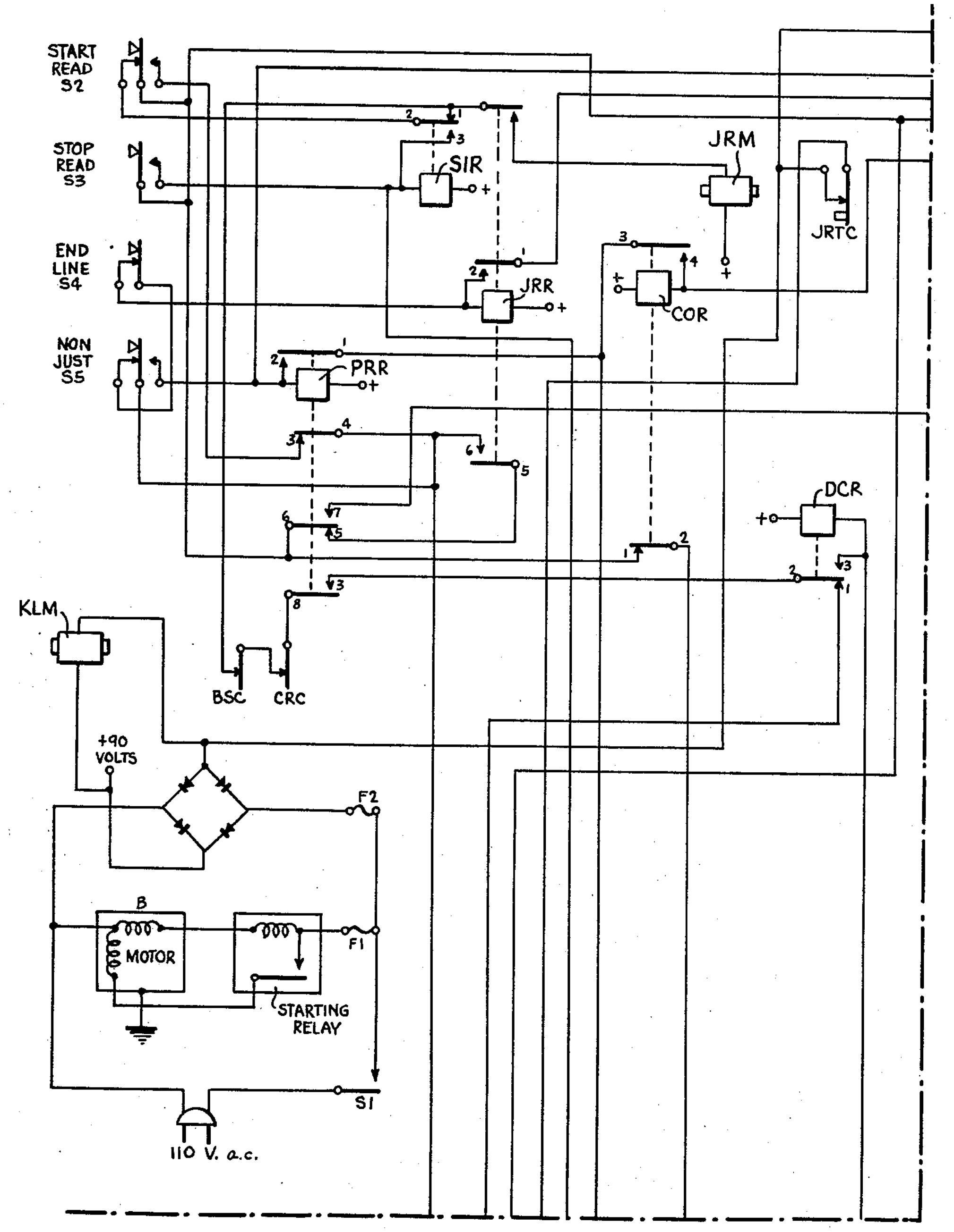
Figs. 2, 3, 4, 5 and 6 represent the electrical circuit arrangement of a justifying typewriter embodying the present invention in a particular form.
Figure 3:
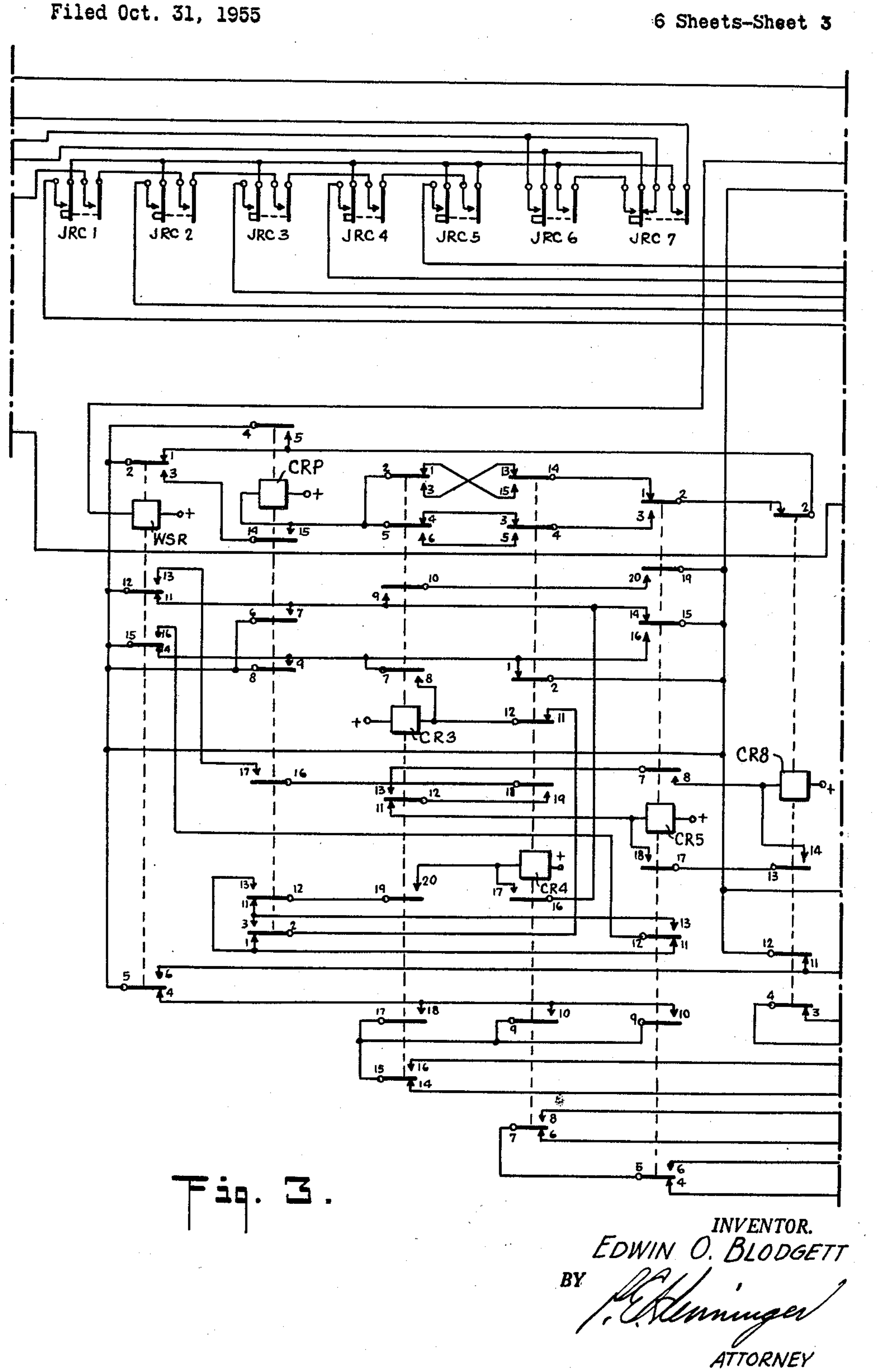
Figure 4:
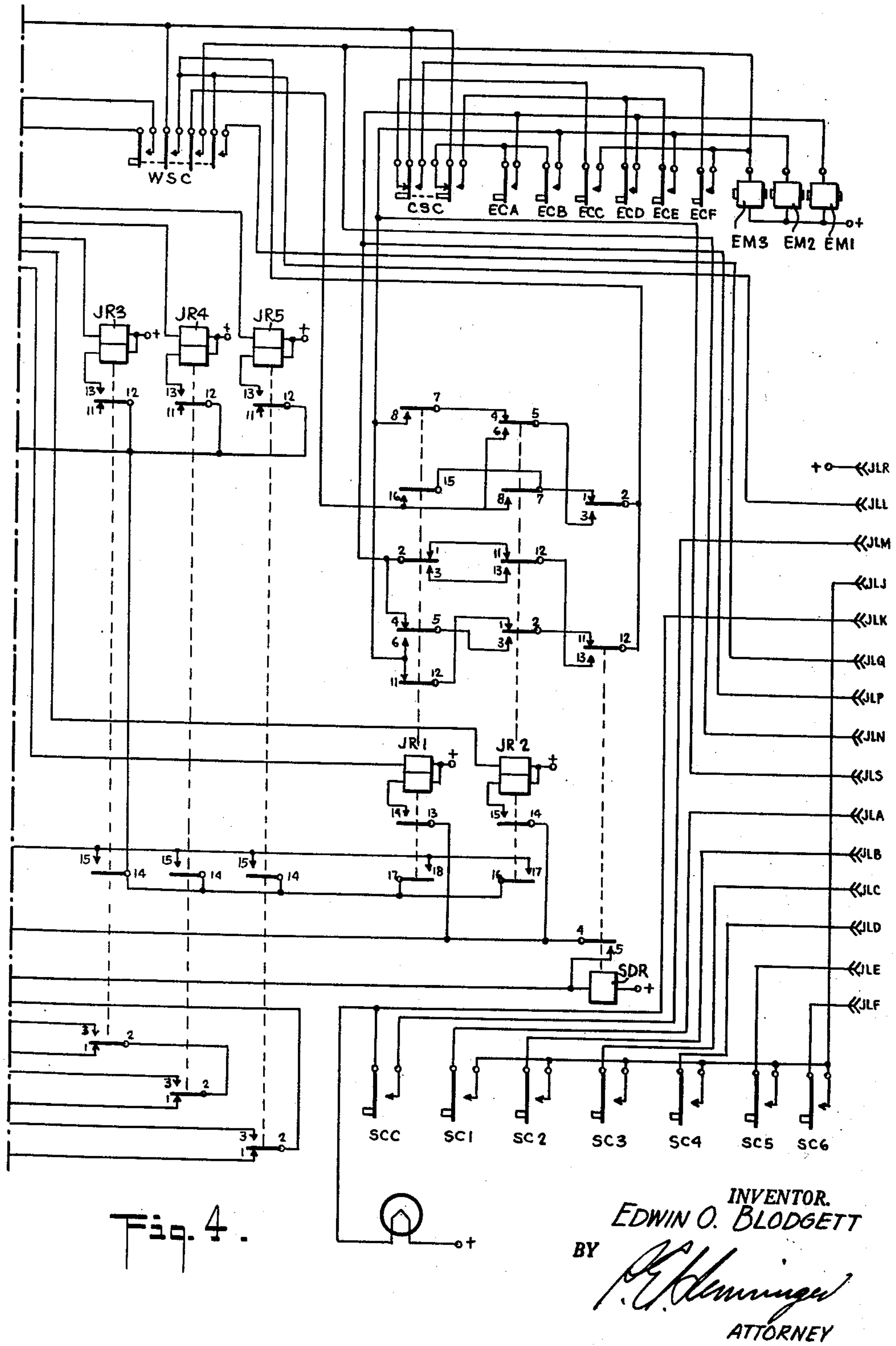
Figure 5:
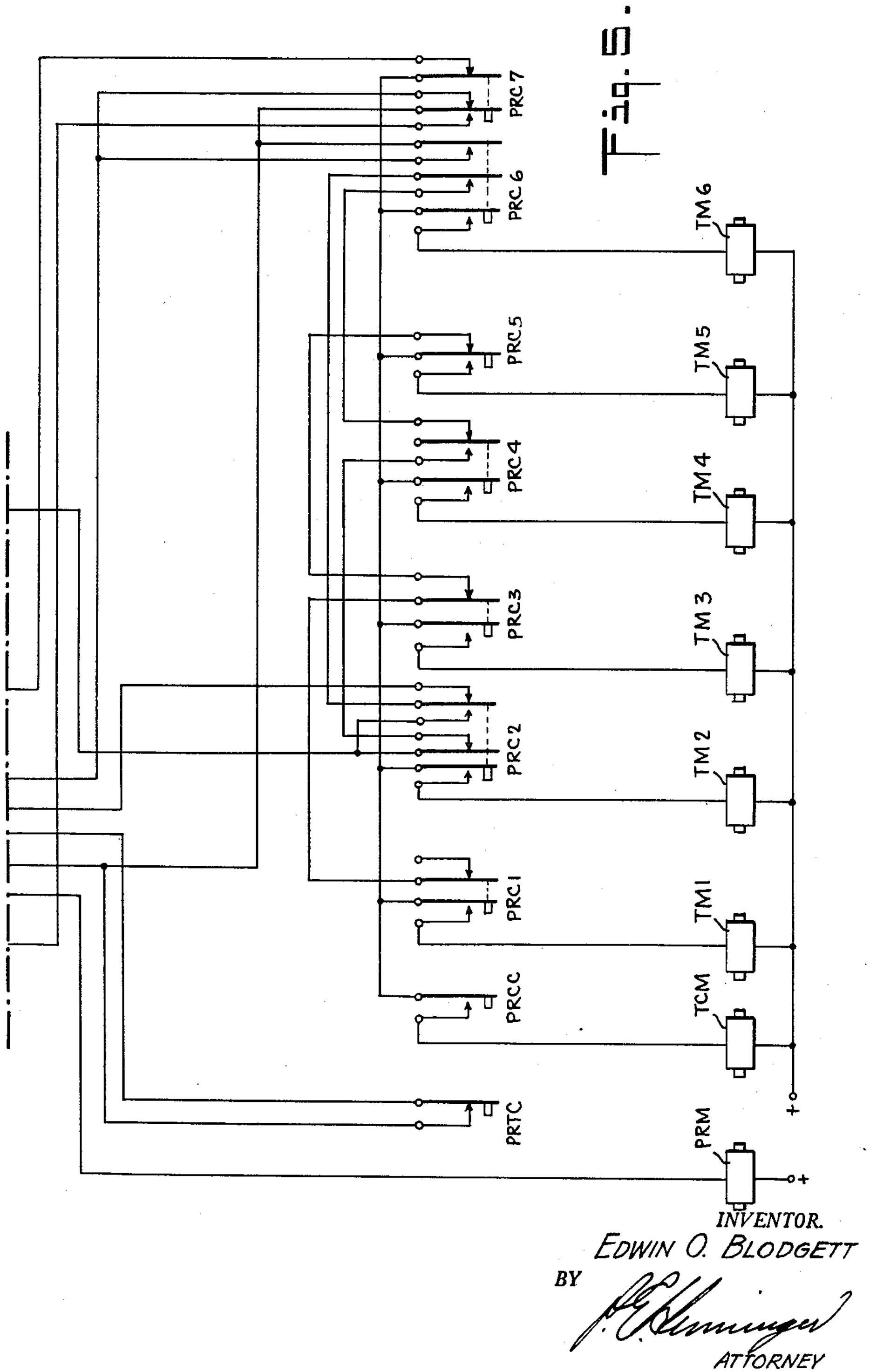

Referring particularly to the keyboard arrangement of Fig. 1, it will be seen that there is provided a "1-unit" space key lever, a "3-unit" space key lever, and it may be stated that the space bar provides two units of word spacing. Thus word spacing having any values from 1–3 units may be obtained by selective operation of the 1-unit and 3-unit key levers and the space bar individually, or word spacing values of 4 and 5 units by concurrent actuation of the two key levers or concurrent actuation of the space bar and the 3-unit key lever. This actuation is not accomplished manually, but rather by automatic operation of the typewriter under control of a punched tape. In this, the typewriter is of the type disclosed in the above-mentioned Blodgett Patent No. 2,700,447 and includes a justification code reader through which the punched tape first passes to read the end-of-line justification code applicable to a lime of character-print control and functional-control information. The justification code read by the justification code reader is stored in relays for the interval required to effect appropriate word spacings in justifying a given line, and during and subsequent to this interval the character-print control and functional-control codes of the punched tape are read by a print reader provided on the typewriter and through which the punched tape next passes. A maximum of eight word spaces is available for justification purposes, and the justification code establishes the individual values of the word spacings as a line is automatically typed under control of the character-print control and functional-control information read from the punched tape.

Figure 6:
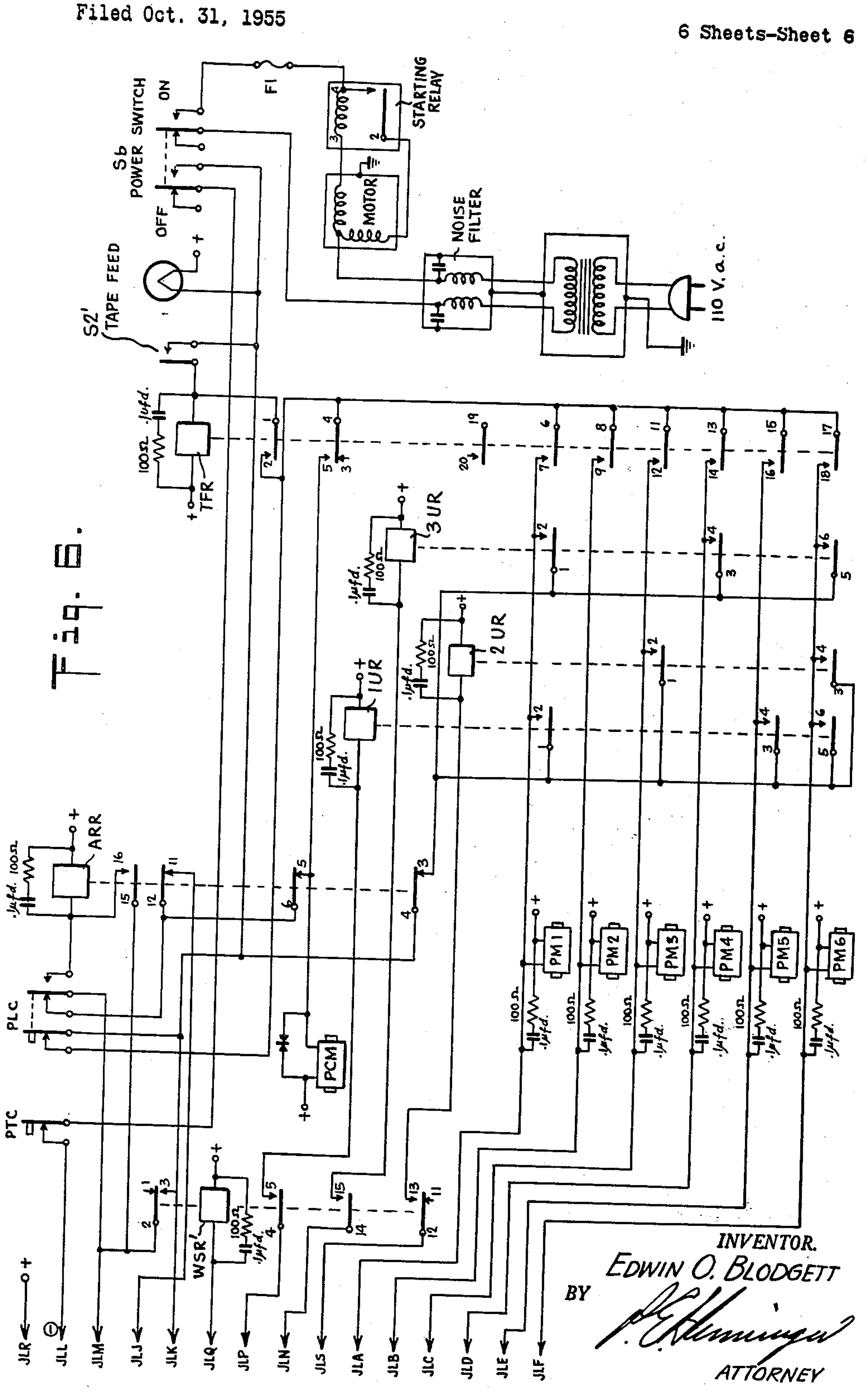

The detailed construction and operation of a justifying typewriter operating as last described is disclosed in the aforesaid Blodgett Patent 2,700,447, and will only briefly be considered here as necessary to an understanding of the present invention. Figs. 2–5 show the electrical control circuit of such a typewriter as modified to embody the present invention, and Fig. 6 is the circuit arrangement of a tape punch embodied in or associated with the typewriter but here shown by way of example as a separate unit connected by electrical cable to the typewriter. In this, the tape punch unit is shown as including its own power supply and its own drive motor, and it may have a construction of the type shown in the co-pending application Serial No. 546,902, filed November 15, 1955, entitled Code-Form Converter, in the name of Edwin O. Blodgett, and assigned to the same assignee as the present application.

Referring now more particularly to the control circuit arrangement of Figs. 2–5, operation of the justifying typewriter to read and reproduce the information of a punched tape is initiated by manually depressing and releasing a start read switch S2 to energize a relay JRR through a "nonjustifying" switch S5 and "end line" switch S4. The relay JRR thereupon closes its contacts to energize a justifier-reader magnet JRM to start the operation of the justifying code reader. The latter includes a reader cycling contact JRTC and reading pin actuated contacts JRC1—JRC7. The justification code includes a "7" code hole, so that each justification code actuates the reader contact JRC7 which energizes a print read relay PRR. The particular justification code read at a given time actuates various ones of the reader contacts JRC1—JRC6 to cause corresponding energizations of relays JR1, JR2, JR3, JR4, and JR5 which in effect store the justification code during the interval required to justify a line of copy.

The print read relay PRR, upon becoming energized as last mentioned, energizes the print reader magnet PRM which thereupon places in operation the print reader to read the character print control and functional control information of the punched tape. This reader includes a cycling contact PRCC and reading pin operated contacts PRC1—PRC7 which are actuated individually and in various combinations in reading the punched code holes of the tape. The contacts PRC1—PRC7 control the energizations of translator magnets TM1—TM6, and the latter in turn control a translator structure to actuate the various key levers and functional controls of the typewriter and thereby reproduce the information of the read tape. In this, the print reader does not respond to any "7" code hole and thus ignores each justification code. As each line of copy is thus reproduced, justification of the line by selectable word spacing values occurs in a manner which will be considered in greater detail hereinafter.

Before considering the matter of line justification, it may be pointed out that the justifying typewriter includes certain additional controls meriting mention.

One of these is a key lever lock-up control effected by a key lock magnet KLM, which is energized to unlock the key levers whenever energizing power is supplied to the typewriter by operation of a power switch S1 to closed position.

Also there is an electrical interlock between the operations of the justification code reader and the print reader by interrelated operations of the relays JRR and PRR. With both the justification code and print readers operating, this electrical interlock is such that if the justification code reader reaches a No. 7 code hole in the tape while the print reader is still operating, the justification code reader will be stopped until the print reader reaches a No. 7 code hole. On the other hand, if the print reader finishes the line and reaches the No. 7 code hole while the justification reader is still operating, the print reader will continue to read through the next line. This interlock is accomplished by arranging a holding circuit for the relay JRR to include normally closed contacts of the justification reader contact JRC7 in parallel with normally open contacts JRC6 when print read relay PRR is energized, but when print read relay PRR is deenergized its normally closed contacts hold relay JRR energized even though the other holding circuit of the latter is opened by the contacts of JRC6 and JRC7. The holding circuit for the print read relay PRR includes a normally closed contact of the print reader contact PRC7. Thus it will be clear that the two readers are so interlocked electrically that the justification reader will always first find the justification code for each line before the print reader starts reading that line, and while the print reader is reading and effecting automatic typing of a line the justification reader is searching for the interlock No. 7 code preceding the justification code for the next line to be typed. The interlock No. 7 code which precedes each justification code in the tape is for the purpose of insuring that the justification section will not alter an existing justification control for a line being typed by getting ahead of the print reader in the case where a short line follows a longer line. In other words, the interlock No. 7 code hole space stops the justification reader before it reaches the justification code for the next line where the print reader is still reading and effecting typing of the characters of the preceding line.

A delay control relay DCR is energized temporarily to interrupt operation of the print reader whenever the latter reads either a carriage return code, a tabulation code, or a back space code. This delay is to permit the typewriter carriage to complete its movement in accordance with the coded instruction. Reading is automatically resumed when any of these functions are completed by the carriage.

The operation of the typewriter may be automatically stopped by reading a 4–5–6 stop code in a punched tape. For this purpose, a relay SIR is provided and is normally deenergized but becomes energized upon reading a 4–5–6 stop code. Its energizing circuit includes normally closed contacts of the print reader contacts PRC3 and PRC7 and normally open contacts of the print reader contacts PRC4, PRC5 and PRC6. The holding circuit for this relay includes normally closed contacts of the start read switch S2. The relay SIR upon becoming energized opens the energizing circuit of the print reader magnet PRM and thus interrupts operation of the print reader (also effected by manually depressing the stop read switch S3 to energize relay SIR). The relay SIR will remain energized until the start read switch S2 is manually operated, whereupon the print reader will again start operation upon the release of switch S2. While relay SIR is energized, the justification code reader will continue operation until it reaches a No. 7 code, whereupon it also will stop and start again only upon operation of the start read switch S2.

An "end-line" switch S4 is provided to enable stopping the typewriter with the power off for a long period of time without effecting the justification operation even though an unread length of tape still remains in the readers. As will appear later, the justification controls set up by energization of the justification storage relays may be lost in the event the power switch S1 is turned off while the print reader is operating automatically to type a line. However, when the end-of-line switch S4 is manually depressed and held down until the machine stops, the power switch S1 may then be turned off without danger of losing any justification controls set up in the machine. The function of this end-line switch S4 is merely to open the energizing circuit of the justification read relay JRR so that when the print reader finishes a line the relay JRR will not become energized to start operation of the justification section, and accordingly both the justification reader and print reader will stop with no justification controls stored in the justification relays. Now when the power switch is turned off and later turned on, the start read switch S2 is merely actuated manually to resume normal operation of the machine.

Unjustified copy may be produced from a punched tape having end-of-line justification codes by actuating a non-justify switch S5 which is automatially retained in depressed position. With the switch S5 in depressed position, pressing the start read switch S2 does not energize the justification read relay JRR as previously described but in this case completes a circuit to energize the print read relay PRR. Thus with punched tape in the print reader, only the print reader magnet PRM is energized upon release of the start read switch S2 to initiate operation of the print reader. The typewriter now reproduces copy as read from the tape but without line justification. The switch S5 is also used with the print reader in reproducing from tape produced in accordance with the present invention and in a manner hereinafter explained. But in this case the lines of the reproduced copy are inherently justified since the justification code is inserted between word spaces and establishes the individual word space values.

In producing a justification code tape, as by use of a "trial copy recorder" of the type disclosed in the aforesaid Blodgett Patent 2,700,421, occasion may arise when it is desired to delete a complete trial copy line for some reason. To this end, a line delete code 1–2–3–4–5–6–7 may be punched in the tape in place of the justification code to delete the entire line preceding this delete code. Now when this code is read by the justification code reader, a circuit is completed for energizing a cut-out relay COR through a series of normally open contacts of all seven contacts JRC1—JRC7 of the justification code reader. A holding circuit for relay COR is provided and is controlled in the same manner as the holding circuit for the print read relay PRR, so that relay COR is held energized until the print reader finishes the line following the line delete code as read at the justification code reader. While relay COR is energized, a normally closed contact of this relay is opened to open the circuit which energizes the translator magnets TM1—TM6 through the print reader contacts PRC1—PRC6. Accordingly, that particular line of copy is not printed.

The manner in which line justification is automatically accomplished in conformity with each read justification code will now be briefly considered, reference being made to the aforesaid Blodgett Patent No. 2,700,447 for the detailed construction and operation of the justification control components of the typewriter and their electrical control circuit. As earlier indicated, justification is accomplished by control of word spacings up to and including the eighth word space. The actual extent of spacing between words is accomplished by energization of escapement magnets EM1, EM2 and EM3 either individually or in selected combinations, and these magnets in turn control individual ones of escapement ratchet mechanisms which determine the precise value of word spacing selected. The space bar of the typewriter is automatically operated by reading a word space code 3–6 in the tape passing through the print reader, but its operation does not directly select the energization of the escapement magnets EM1—EM3, but rather the space bar controls a contactor WSC. Two pairs of the WSC contacts control the energizing circuits for the escapement magnets EM1—EM3, and another pair of contacts of WSC controls the energization of a word space repeater relay WSR. The extent of word spacing resulting from operation of the contactor WSC is under the joint control of two justification code storage relays JR1 and JR2 and a step down relay SDR. The latter relay when energized functions to reduce by 1 unit each of the four values of word spacing selected by the relays JR1 and JR2. Thus with relay SDR deenergized, the initial word spacing in a line is always determined by relays JR1 and JR2, and the point at which this extent of word spacing is reduced during typing of the line is determined by the energization of the step down relay SDR in order that all lines may be justified regardless of the change in length required and the number of word spaces in the line.

The point at which the extent of word spacing is reduced 1-unit by the energization of relay SDR is perforated in the justification code of the tape in the form of a 3-unit code. This code conditions three storage relays JR3, JR4 and JR5. In order that relay SDR may be energized after the proper number of word spaces in a line in accordance with this information stored in relay JR3, JR4, nad JR5, three relays CR3, CR4 and CR5 become energized during typing of the line in certain combinations corresponding to the various accumulated number of word spaces throughout the line. When the condition of relays CR3, CR4 and CR5 correspond respectively to the stored condition of relays JR3, JR4 and JR5, relay SDR becomes energized to reduce the value of word spaces thereafter.

The contacts of the word space repeater relay WSR and contacts of a half-step relay CRP are used to set up conditions of relays CR3, CR4 and CR5 which correspond to the accumulated number of spaces in typing a line. In addition, a final count relay CR8 is provided to deenergize relays JR1, JR2 and SDR after the eighth word space so that any additional word spaces will be at the normal 2-unit value. This 2-unit value is established by the contact WSC closing its contacts, by actuation of the space bar, to energize the escapement magnet EM2 through normally closed contacts of deenergized relays JR1, JR2 and SDR. Circuits for energizing relays CRP, CR3, CR4, CR5, and CR8 include normally open contacts of all five storage relays connected in multiple. This arrangement permits operation of the counting relay arrangement only if a code has been stored in the storage relays; for example, where a short line ends a paragraph no justification code is punched in the tape and none of the five relays will be energized so that in typing this line no justification will be made. Justification is effective to reduce a line having a minimum number of eight word spaces by 7 units or to increase a line having a minimum of eight word spaces by 22 units.

In accordance with the present invention, the justifying typewriter during operation, under control of a tape read at its two readers, causes a new tape to be punched in which the individual word spacings required to effect line justification are now appropriately recorded and punched as interword justification codes directly into the new tape at each word space location recorded therein. This new tape may now be placed in the print reader only of the justifying typewriter and the switch S5 closed to effect reproduction of justified copy, the correct value of each word spacing being directly recorded in the new tape and being effective to control each word spacing for correct line justification. At the same time, all deleted lines appearing in the original tape are omitted from the new tape since the latter is produced directly in response to the operation of the typewriter, which it was pointed out above is quiescent during the period when a deleted line is being read in the original tape.

This new tape is produced by a punch unit having the electrical circuit arrangement shown in Fig. 6 and which it was noted above is shown by way of example as a separate motorized unit connected by electrical cable to the typewriter. The negative potential of the typewriter is supplied through a plug-receptacle JLL to a punch tape contact PTC having contacts normally closed by tape positioned in the punch in readiness for punching, the contacts of a power switch S6 in the "on" position, and a plug-receptacle JLK to the selector common contact SCC of a code selector unit provided in the typewriter. When the contact SCC is closed by a character print or function operation of the typewriter, the negative potential of the circuit last traced is supplied from the contact SCC through a plug-receptacle JLM to the normally closed contacts of a punch latch contact PLC and through normally closed contacts 11 and 12 of an anti-repeat relay ARR and a plug-receptacle JLJ to the common side of all of the selector code contacts SC1—SC6 of the typewriter. Thus closure of any of the latter contacts by operation of the code selector during a character print or functional control operation of the typewriter is effective to energize through plug-receptacles JLA—JLF individual ones of respective punch magnets PM1—PM6 to punch corresponding character codes or functional control codes in the new tape produced by the motorized unit. The negative potential circuit through the normally closed contacts of the punch latch contact PLC is also completed through normally closed contacts 5 and 6 of the anti-repeat relay ARR to energize a punch clutch magnet PCM to initiate a cycle of operation of the tape punch whenever the selector common contact SCC of the typewriter closes. Thus the new tape is punched during operation of the justifying typewriter to punch successive codes corresponding to characters printed and functions executed by the typewriter during this operation.

The manner of recording the justification codes in the new tape is unique. It has heretofore been conventional to control all essential operations of a punch unit, such as that of Fig. 6 by operation of the code selector and its contacts SCC—SC6 in response to character key lever and functional control actuation of the typewriter. In the present arrangement, on the other hand, the code selector does not function to code the new tape for word-spacing functions. Rather, each word spacing function and the individual word space value is recorded in the new tape by an individual punch code determined and controlled by word spacing energizations of the escapement magnets EM1—EM3 of the typewriter in reproducing a justified line of copy. That is, as the typewriter operates to space the carriage to a variable extent between successive words as required for line justification, it does so by virtue of the justification-code controlled selective energizations of the escapement magnets EM1—EM3 and these energizations cause a distinctive code to be punched in the new tape according to the extent of and corresponding to each word spacing automatically selected by the typewriter. Thus the latter in operating under control of the tape which it reads, and which includes justification-control information at the end of each line of character-control and functional-control information, receives the justification code and translates it into individual word space values and these are recorded in the new tape in the form of interword justification codes.

Considering this interword justification coding in greater detail, it was pointed out above that the space bar actuates the contact WSC which includes a pair of contacts arranged upon closing to supply negative potential through a plug-receptacle JLQ to a word space control relay WSR'. Further, the energizing circuit for the esapement magnet EM1 is connected through a plug-receptacle JLP and the contacts 4 and 5 of the word space relay WSR' to energize a "1-unit" space-code relay 1UR, the energizing circuit for the escapement magnet EM2 is connected through a plug-receptacle JLS and the contacts 12 and 13 of the word space relay WSR' to energize a "2-unit" space-code relay 2UR, and the energizing circuit of the escapement magnet EM3 is connected through a plug-receptacle JLN and the contacts 14 and 15 of the word space relay WSR' to energize a "3-unit" space-code relay 3UR. It will thus be clear that whenever the space bar is operated to close the contact WSC, the word space relay WSR' of the punch unit is energized and one or more of the space-code relays 1UR, 2UR and 3UR will be energized concurrently with corresponding ones of the escapement magnets EM1—EM3 depending upon the extent of each word spacing automatically selected by the typewriter in typing a justified line. For example, if a 1-unit word space is selected by the typewriter and escapement magnet EM1 is accordingly energized, relay 1UR will be energized to close its three pairs of contacts and thereby energize punch magnets PM1, PM5 and PM6 to cause punching of a 1–5–6 code into the new tape. Similarly, if a 2-unit word space is selected by the typewriter, relay 2UR will be energized to close its two pairs of contacts and thereby energize punch magnets PM3 and PM6 to punch a 3–6 code into the new tape. In like fashion, selection of a 3-unit word space by the typewriter will effect energization of relay 3UR to close its three pairs of contacts and thereby energize punch magnets PM1, PM4 and PM6 to punch a 1–4–6 code into the tape. When a 4-unit word space is selected by the typewriter by concurrent energization of escapement magnets EM1 and EM3, both relays 1UR and 3UR are energized selectively to punch a 4-unit space code 1–4–5–6 into the tape, and the selection of a 5-unit word space effects energization of relays 2UR and 3UR to cause punching of a 1–3–4–6 word space code into the new tape.

Thus the tape produced by the punch unit of Fig. 6 will have the correct value of each word spacing required for justification suitably recorded by an appropriate code and this code is located at each point of word spacing in the tape.

When a tape produced by the punch unit of Fig. 6 is now placed in the print reader of the typewriter and the switch S5 closed, line justification is directly effected without the requirement of end-of-line justification code interpretation as was previously required. In this, it may be noted that each word spacing value recorded by appropriate coding in the new tape directly controls, through the print reader of the typewriter, the selective actuation of the space bar, 1-unit key lever, and 3-unit key lever either alone or in various combinations as determined by the coded word spacing value and as required for correct line justification. Such actuation of the space bar causes the contacts WSC to close and thereby energize the escapement magnet EM2 in the manner above described to select a 2-unit word space, and actuation of the 1-unit and 3-unit key levers operates through the code translator selectively to close the contacts ECA—ECF and thereby directly energize the escapement magnets EM1 and EM3 either alone or in combination with each other or with the escapement magnet EM2 to provide the required word spacings selected by each word spacing code of the new tape.

It will be apparent from this that the new tape produced by the punch unit of Fig. 6 enables justified copy to be reproduced by a typewriter of greatly simplified form since the latter now no longer needs for justification purposes (and there can thereby be omitted from its structure) the justification read relay JRR, the justification reader including the justification reader magnet JRM and justification reader contacts JRTC—JRC7, the word space relay WSR and all of the justification control relays CRP, CR3, CR4, CR5, CR8, JR1—JR5, and SDR. Such simplified form of justifying typewriter also need not include a code selector with its associated code selector contacts SCC—SC6. This simplified form of justifying typewriter not only has the virtue of substantially reduced initial cost, but appreciably reduces the extent and cost of servicing and maintenance during its normal operating life.

At the same time, it will be apparent that the 6 channel code produced by the punch unit of Fig. 6 may be readily transmitted to a remote point by wire transmission, especially since the character-codes and functional-control codes may be readily selected as indicated in Fig. 1 to have the same assignment as the first 5 channels of the code used in standard telecommunications machines. The code selection last mentioned has the further advantage that it greatly facilitates conversion, and later reconversion, of the 6 channel code to a standard 5 channel code by use of the code converter and code reconverter disclosed in the aforementioned application Serial No. 546,902, this 5-unit code being suitable for transmission by all standard 5 channel telecommunications systems.

The punch unit of Fig. 6 includes a conventional anti-repeat relay ARR which is energized through normally open contacts of the punch latch contact PLC, a plug-receptacle JLM, and the selector common contact SCC of the typewriter and operates in conventional manner to prevent punching by the punch unit of more than one code for each operation of the typewriter. The punch unit also includes a manually operable tape feed switch S2′ by which to effect tape feed by energization of a tape feed relay TFR and through this relay the energization of the punch clutch magnet PCM and punch magnets PM1—PM6 to effect punching of a delete code 1–2–3–4–5–6 as long as the switch S2′ is manually maintained in depressed position.

While a specific form of the invention has been described for purposes of illustration, it is contemplated that numerous changes may be made without departing from the spirit of the invention.

What is claimed is:

1. A recorder for recording information previously recorded in a record medium and including character-print, functional-control, and end-of-line-computed justification-control information required to reproduce justified copy comprising: means including record medium reading means for deriving and newly recording in a new record medium said pre-recorded end-of-line character-print and functional-control information; means responsive to said pre-recorded end-of-line justification-control information to drive for each line of said copy control effects each defining an individual one of plural word spacing values required to effect line justification; and means responsive to said control effects for newly recording in said new record medium in interword interspersed relation to said first-mentioned newly recorded information justification word-spacing information identifying each word space and said defined word-spacing value thereof.

2. A recorder for recording information previously recorded in a record medium and including character-print, functional-control, and end-of-line-computed justification-control information required to reproduce justified copy comprising: means including record medium reading means for deriving and newly recording in a new record medium said pre-recorded character-print and functional-control information; means responsive to said pre-recorded end-of-line justification-control information to derive for each line of said copy control effects each defining an individual one of plural word spacing values required to effect line justification; and means responsive to each said control effect for newly recording in said new record medium in interword interspersed relation to said first-mentioned newly recorded information an individual-valued unit of corresponding word-space function-control information including information identifying the corresponding word-spacing value required for line justification.

3. A recorder for recording information previously recorded in a record medium and including character-print, functional-control, and end-of-line-computed justification-control information required to reproduce justified copy comprising: means for providing for at least one line-recording interval storage of each line of said character-print and functional-control information; means responsive to said pre-recorded justification-control information to derive for each line of said copy control effects each defining an individual one of plural word spacing values required to effect line justification; and means operatively responsive to said control effects newly to record in a new record medium said pre-recorded character-print and functional-control information with word-space functional-control information including word-space values required for line justification newly recorded in interword interspersed relation in each line with recording of said print-control and functional-control information.

4. A justifying-printer information recorder comprising: means for reading a record medium to derive therefrom recorded print-control, functional-control, and end-of-line justification-control information required to reproduce multiple-line justified printed copy; means responsive to the pre-recorded print-control and functional-control information derived by said reading means for reproducing said copy and responsive to the pre-recorded end-of-line justification-control information derived thereby for controlling successive word spacings to justify the lines of said reproduced copy; and means responsive to the operations of said reproducing means for newly recording in interspersed relation in a new record medium print-control, functional-control, and individual interword justification-control information required to duplicate said reproduced copy.

5. A justifying-printer information recorder comprising: means for reading a record medium having recorded print-control, functional-control, and end-of-line justification-control information required to reproduce multiple-line justified printed copy selectively to derive therefrom said justification-control information for each line of said copy; means for subsequently reading said medium selectively to derive the print-control and functional-control information corresponding to said each line of copy; and means responsive to the information derived by each of said means for newly recording in interspersed relation in a new record medium print-control, functional-control, and individual interword justification-control information required to duplicate said copy.

6. A justifying-printer information recorder comprising: means for reading a record medium to derive therefrom recorded print-control, functional-control, and end-of-line justification-control information required to reproduce multiple-line justified printed copy; means responsive to the print-control and functional-control information derived by said reading means for reproducing said copy and responsive to the justification-control information derived thereby for controlling successive word spacings to justify the lines of said reproduced copy; and means responsive to the operations of said reproducing means for newly recording in interspersed relation in a new record medium and in a lesser number of channels than employed by said first-mentioned medium print-control, functional-control and individual interword justification-control information required to duplicate said reproduced copy.

7. A justifying printer information recorder comprising: means for reading a record medium having recorded print-control, functional-control, and end-of-line justification-control information required to reproduce multiple-line justified printed copy selectively to derive therefrom said justification-control information for each line of said copy; means for subsequently reading said medium selectively to derive the print-control and functional-control information corresponding to said each line of copy; and means responsive to the information derived by each of said means for newly recording in interspersed relation in a new record medium but in a lesser number of channels than employed by said first-mentioned medium print-control, functional-control and individual interword justification-control information required to duplicate said copy.

8. A justifying-printer information recorder comprising: means for receiving print-control, functional-control, and end-of-line justification-control information corresponding to multiple-line justified copy; printing means responsive to said print-control and functional-control information for printing each line of said copy; justifying means responsive to said justification-control information for controlling said printing means to effect spacing of successive words of said each line of copy by word-spacing values required to justify said each line of copy; and means responsive to the operations of said printing and justifying means for newly recording in interspersed relation in a new record medium print-control, functional-control, and individual interword justification-control information required to duplicate said reproduced copy.

9. A justifying-printer information recorder comprising: means for receiving print-control, functional-control and end-of-line justification-control information and responsive to said received information for deriving corresponding control effects, means responsive to said derived control effects corresponding to said print-control and functional-control information for printing each line of said copy; justifying means responsive to control effects corresponding to said justification-control information for controlling said printing means to effect word-spacings having word spacing values required to effect justification of each printed line; and means responsive to the operations of said printing means and justifying means for newly recording in a new record medium print-control, functional-control and interword justification-control information required to duplicate said reproduced copy.

10. A justifying-printer information recorder comprising: means for reading a record medium to derive therefrom recorded print-control, functional-control, and end-of-line justification-control information required to reproduce multiple-line justified printed copy; means responsive to the print-control and functional-control information derived by said reading means for reproducing said copy and responsive to the justification-control information derived thereby for controlling successive word-spacings to justify the lines of said reproduced copy; and punch means responsive to the operations of said reproducing means for newly making in a tape record medium a punch-code record-tape recording of print-control, functional-control, and interword justification-control information required to duplicate said reproduced copy.

11. A justifying-printer information recorder comprising: means for reading a record medium having recorded print-control, functional-control, and end-of-line justification-control information required to reproduce multiple-line justified printed copy selectively to derive therefrom said justification-control information for each line of said copy; means for subsequently reading said medium selectively to derive the print-control and functional-control information corresponding to said each line of copy; and means responsive to the information derived by each of said means for newly making in a tape record medium a punch-code record-tape recording of print-control, functional-control and interword justification-control information required to duplicate said copy, said justification-control information being recorded in interword relation to said print-control and functional-control information.

12. A justifying-printer information recorder comprising: means for reading a seven channel puched tape to derive therefrom punch recorded print-control, functional-control, and end-of-line justification-control information required to reproduce multiple-line justified printed copy; means responsive to the print-control and functional-control information derived by said reading means for reproducing said copy and responsive to the justification-control information derived thereby for controlling successive word spacings to justify the lines of said reproduced copy; and punch means responsive to the operations of said reproducing means for newly making in a record tape a six channel punched hole recording of the print-control, functional-control and interword justification-control information required to duplicate said reproduced copy, said justification-control information being recorded in interword relation to said print-control and functional-control information.

13. A justifying-printer information recorder comprising: means for reading a seven channel punched record medium having recorded print-control, functional-control and end-of-line justification-control information required to reproduce multiple-line justified printed copy selectively to derive therefrom said justification-control information for each line of said copy; means for subsequently reading said medium selectively to derive the print-control and functional-control information corresponding to said each line of copy; and punch means responsive to the information derived by each of said means for newly providing a six channel punched record medium of the print-control, functional-control, and interword justification-control information required to duplicate said copy, said justification-control information being recorded in interword relation to said print-control and functional-control information.

14. A justifying typewriter comprising, means for reading a record medium to derive therefrom and temporarily store each of successively recorded end-of-line justification-control data, word-spacing control means responsive to said temporarily stored data for selectively establishing the spacing values of successive words in each line of reproduced copy, means for reading said medium to derive therefrom character-print and functional-control information recorded in said medium preceding said each justification-control data, printing means responsive to said derived information for reproducing under control of said control means justified lines of copy, and means responsive to the operations of said control and printing means for newly recording in a new record medium each of said justification interword spacing values and said print-control and functional-control information to provide a composite record including all information required to duplicate each of successive lines of said reproduced justified copy.

15. A justifying typewriter comprising, means for reading a seven channel record medium to derive therefrom and temporarily store each of successively recorded end-of-line justification-control data, word-spacing control means responsive to said temporarily stored data for selectively establishing the spacing values of successive words in each line of reproduced copy, means for reading said medium to derive therefrom character-print and functional-control information recorded in said medium preceding said each justification-control data, printing means responsive to said derived information for reproducing under control of said control means justified lines of copy, and means responsive to the operations of said control and printing means for newly recording in a new record medium using a six channel code each of said justification interword spacing values and said print-control and functional-control information to provide a composite record including all information required to duplicate each of successive lines of said reproduced justified copy.

16. A punched-tape controlled justifying type writer comprising, means including a first tape reader for reading punched tape to derive therefrom and temporarily store justification-control information corresponding to each of successively recorded end-of-line justification-control punched codes, word-spacing control means responsive to said temporarily stored information for selectively establishing the spacing values of successive words in each line of reproduced copy, a second tape reader for reading said tape to derive therefrom character-print and functional-control information recorded in said tape preceding said each justification-control code, printing means responsive to said derived information for reproducing under control of said control means justified lines of copy, and a tape punch operating under control of said control and printing means for providing a new punched tape recording of each of said justification interword spacing values and said print-control and functional-control information to provide a composite punched tape record including all information required to duplicate said reproduced justified copy.

17. A justifying-printer information recorder comprising: means for reading a record medium to derive therefrom recorded print-control, functional-control and end-of-line justification-control information required to reproduce multiple-line justified printed copy; means responsive to the print-control and functional-control information derived by said reading means for reproducing said copy and responsive to the justification-control information derived thereby for controlling successive word spacings to justify the lines of said reproduced copy; means responsive to derived justification-control information for maintaining coordinated response by said reproducing means to the derived print-control and functional-control information to which the derived justification-control information relates; and means responsive to the operation of said reproducing means for recording in interspersed relation in a record medium print-control, functional-control, and individual interword justification-control information required to duplicate said reproduced copy.

18. A justifying-printer information recorder comprising, means for reading a record medium to derive therefrom and temporarily store each of successively recorded end-of-line justification-control data, word-spacing control means responsive to said temporarily stored data for selectively establishing the spacing values of successive words in each line of reproduced copy, means for reading said medium to derive therefrom character-print and functional-control information recorded in said medium preceding said each justification-control data, printing means responsive to said derived information for reproducing under control of said control means justified lines of copy, means responsive to said derived justification-control data for controlling at least one of said means to maintain coordinated utilization by said control and printing means of the derived justification-control data and derived character-print and functional-control information to which it relates, and means responsive to the operations of said control and printing means for recording in a record medium each of said justification interword spacing values and said character-print and functional-control information to provide a composite record including all information required to duplicate each of successive lines of said reproduced justified copy.

19. A justifying-printer information recorder comprising, first means for reading a record medium to derive therefrom and temporarily store each of successively recorded end-of-line justification-control data, word-spacing control means responsive to said temporarily stored data for selectively establishing the spacing values of successive words in each line of reproduced copy, second reading means for reading said medium to derive therefrom character-print and functional-control information recorded in said medium preceding said each justification-control data, printing means responsive to said derived information for reproducing under control of said control means justified lines of copy, means responsive to derivation of said justification-control data by each of said reading means for controlling said first reading means to insure line-by-line coordination in the utilization of said derived data and derived information respectively by said control and printing means, and means responsive to the operations of said control and printing means for recording in a record medium each of said justification interword spacing values and said character-print and functional-control information to provide a composite record including all information required to duplicate each of successive lines of said reproduced justified copy.

20. A justifying-printer information recorder comprising, first means for reading a record medium to derive therefrom and temporarily store each of successively recorded end-of-line justification-control data, word-spacing control means responsive to said temporarily stored data for selectively establishing the spacing values of successive words in each line of reproduced copy, second reading means for reading said medium to derive therefrom character-print and functional-control information recorded in said medium preceding said each justification-control data, printing means responsive to said derived information for reproducing under control of said control means justified lines of copy, means responsive to derivation of new justification-control data by said first reading means at a time preceding completion of derivation of said preceding character-print and functional-control information by said second reading means for temporarily halting the reading operation of said first reading means until said second reading means also derives but operationally ignores the corresponding new justification-control data of said medium, and means responsive to the operations of said control and printing means for recording in a record medium each of said justification interword spacing values and said character-print and functional-control information to provide a composite record including all information required to duplicate each of successive lines of said reproduced justified copy.

21. A recorder for recording information including character-print, functional-control, and end-of-line-computed justification-control information required to reproduce justified copy comprising: means for providing for at least one line-recording interval storage of each line of said character-print and functional-control information; means responsive to said justification-control information to derive for each line of said copy control effects each defining an individual one of plural word spacing values required to effect line justification; means operatively responsive to said control effects to record in a record medium said character-print and functional-control information with word-space functional-control information defining word-space values required for line justification stored in interspersed relation in each line with storage of said print-control and functional-control information; and means responsive to end-of-line positioned delete-control information for terminating the operation of said recording means until the end of the line of character-print and functional-control information preceding said delete-control information.

22. A justifying-printer information recorder comprising: means for reading a record medium to derive therefrom recorded print-control, functional-control, and end-of-line justification-control information required to reproduce multiple line justified printed copy; means responsive to the print-control and functional-control information derived by said readnig means for reproducing said copy and responsive to the justification-control information derived thereby for controlling successive word spacings to justify the lines of said reproduced copy; means responsive to end-of-line positioned delete-control information derived by said reading means for terminating the operation of said reproducing means until the end of the line of print-control and functional-control information preceding said delete-control information; and means responsive to the operations of said reproducing means for recording in interspersed relation in a record medium print-control, functional-control and individual interword justification-control information required to duplicate said reproduced copy.

23. A justifying-printer information recorder comprising: first means for reading a record medium having recorded print-control, functional-control, and end-of-line justification-control information required to reproduce multiple line justified printed copy selectively to derive therefrom said justification-control information for each line of said copy; second means for subsequently reading said medium selectively to derive the print-control and functional-control information corresponding to said each line of copy; means responsive to the information derived by each of said first and second means for recording in interspersed relation in a record medium print-control, functional-control, and individual interword justification-control information required to duplicate said copy; and means responsive to recorded end-of-line positioned delete-control information derived by said first reading means for terminating the operation of said recording means until said second reading means has reached the end of the line of recorded information which preceded said recorded delete-control information.

24. A justifying-printer information recorder comprising: means for reading a record medium to derive therefrom recorded print-control, functional-control and end-of-line justification-control information required to reproduce multiple line justified printed copy; means responsive to the print-control and functional-control information derived by said reading means for reproducing said copy and responsive to the justification-control information derived thereby for controlling successive word spacings to justify the lines of said reproduced copy; means responsive to the operations of said reproducing means for recording in interspersed relation in a record medium and in a lesser number of recording channels than that employed by said first-mentioned medium print-control, functional-control and individual interword justification-control information required to duplicate said reproduced copy; and means responsive to delete-control information recorded in said first-mentioned medium in substitution for end-of-line justification-control information for terminating the operation of said recording means until the end of the line of print-control and functional-control information preceding said delete-control information.

25. A recorder for recording information including character-print, functional-control and justification-control information required to reproduce justified copy comprising: means for reproducing line-justified copy while concurrently developing control effects corresponding to and identifying character-print and functional-control information required to duplicate said copy; said means including word-space control means operative during said reproduction of copy selectably to establish unit values of each of the word spacings employed throughout each line of justified copy; means responsive to said developed control effects for recording in a record medium said character-print and functional-control information; and means responsive to the operations of said word-space control means for effecting recording in said medium by said recording means of information of each value of word spacing with the word-spacing information recorded in interword relation to the recorded character-print and functional-control information.

26. A recorder for recording information including character-print, functional-control and justification-control information required to reproduce justified copy comprising: means for reproducing line-justified copy while concurrently developing control effects corresponding to and identifying character-print and functional-control information required to duplicate said copy; said means including a plurality of devices selectably controlled by each word spacing operation during said reproduction of copy selectably to establish unit values of each of the word spacings employed throughout each line of justified copy; means responsive to said developed control effects for recording in a record medium said character-print and functional-control information; and means controlled by said devices for controlling said recording means to effect recording thereby of information of each said value of word spacing with the word-spacing information recorded in interword relation to the recorded character-print and functional-control information.

27. A justifying-printer information recorder comprising: means for receiving print-control, functional-control and end-of-line justification-control information corresponding to multiple-line justified copy; printing means responsive to said print-control and functional-control information for printing each line of said copy, said printing means including word-space control means operative during said reproduction of copy selectably to establish unit values of each of the word spacings employed throughout each line of said printed copy; means responsive to said justification-control information for controlling said word-space control means to effect controlled variable spacing of successive words of each line of copy by word-spacing values required to justify said each line of copy; means responsive to the operation of said printing means for recording in a record medium print-control and functional-control information required to reproduce said printed copy; and means responsive to the operation of said word-space control means for recording in said record medium in interword relation to the recorded print-control and functional-control information word-spacing information required to duplicate each said line justification.

References Cited in the file of this patent

UNITED STATES PATENTS

| | | |
|---|---|---|
| 536,149 | Johnson | Mar. 19, 1895 |
| 2,390,413 | Ayres | Dec. 4, 1945 |
| 2,412,422 | Rabenda | Dec. 10, 1946 |
| 2,543,435 | Buckley | Feb. 27, 1951 |
| 2,556,220 | Rosenberger | June 12, 1951 |
| 2,605,879 | O'Halloran | Aug. 5, 1952 |
| 2,700,421 | Blodgett | Jan. 25, 1955 |
| 2,700,446 | Blodgett | Jan. 25, 1955 |
| 2,700,447 | Blodgett | Jan. 25, 1955 |

FOREIGN PATENTS

| | | |
|---|---|---|
| 1,121,997 | France | Aug. 29, 1958. |